(12) United States Patent
Soni et al.

(10) Patent No.: US 10,195,585 B2
(45) Date of Patent: *Feb. 5, 2019

(54) PHYCOCYANIN EXTRACTION AND PRODUCTION OF CRUDE BIO-OIL FROM BIOMASS

(71) Applicant: RELIANCE INDUSTRIES LIMITED, Mumbai, Maharashtra (IN)

(72) Inventors: Badrish Ranjitlal Soni, Navsari Gujarat (IN); Mandan Chidambaram, Tamil Nadu (IN); Kshudiram Mantri, West Bengal (IN); Vijayakumar Vinodhkumar, Batlagundu (IN); Sasanka Raha, Maharashtra (IN); Venkatesh Prasad, Karnataka (IN); Ramesh Bhujade, Maharashtra (IN); Santanu Dasgupta, West Bengal (IN); Nagesh Sharma, Vadodara Gujarat (IN); Raksh Vir Jasra, Vadodara Gujarat (IN)

(73) Assignee: Reliance Industries Limited, Mumbai (IN)

( * ) Notice: Subject to any disclaimer, the term of this patent is extended or adjusted under 35 U.S.C. 154(b) by 169 days.

This patent is subject to a terminal disclaimer.

(21) Appl. No.: 14/982,624

(22) Filed: Dec. 29, 2015

(65) Prior Publication Data

US 2016/0130504 A1    May 12, 2016

Related U.S. Application Data

(63) Continuation-in-part of application No. 14/652,283, filed as application No. PCT/IN2014/000313 on May 8, 2014, now Pat. No. 10,118,159.

(30) Foreign Application Priority Data

Sep. 6, 2013 (IN) .......................... 2899/MUM/2013

(51) Int. Cl.
  *C10B 53/02* (2006.01)
  *C10B 57/06* (2006.01)
  (Continued)

(52) U.S. Cl.
  CPC ................. *B01J 21/04* (2013.01); *C10L 1/02* (2013.01); *C10L 9/086* (2013.01); *B01J 23/882* (2013.01); *B01J 37/0203* (2013.01); *Y02E 50/14* (2013.01)

(58) Field of Classification Search
  CPC .. B01J 21/04; B01J 23/28; B01J 23/75; C10B 53/02; C10B 57/06; Y02E 50/14
  See application file for complete search history.

(56) References Cited

U.S. PATENT DOCUMENTS

2004/0168648 A1* 9/2004 Ayers .................... A01K 61/00
                                                                  119/200
2009/0119979 A1* 5/2009 Mullen ................ B01J 31/0239
                                                                  44/308

(Continued)

FOREIGN PATENT DOCUMENTS

JP    WO 2011036862 A1 *  3/2011  .............. B01J 23/85

OTHER PUBLICATIONS

Specification of 2899MUM2013.
Specification of 1143MUM2014.

*Primary Examiner* — Jun Li
(74) *Attorney, Agent, or Firm* — Ladas & Parry LLP (57) ABSTRACT

The present disclosure relates to a process for the conversion of biomass to crude bio-oil. Phycocyanin is extracted from the biomass to form phycocyanin extracted biomass (PEB) and subjecting the PEB to HTL conversion to obtain crude bio-oil. PEB results in improved yield of crude bio-oil as compared to the crude bio-oil yield from biomass without first extracting the phycocyanin from the biomass.

7 Claims, 3 Drawing Sheets

(51) Int. Cl.
*B01J 23/75* (2006.01)
*B01J 23/28* (2006.01)
*B01J 21/08* (2006.01)
*B01J 21/04* (2006.01)
*C10L 1/02* (2006.01)
*C10L 9/08* (2006.01)
B01J 23/882 (2006.01)
B01J 37/02 (2006.01)

(56) References Cited

U.S. PATENT DOCUMENTS

2011/0245444 A1* 10/2011 Miller .................. C07C 9/00
　　　　　　　　　　　　　　　　　　　　　526/346
2012/0055077 A1* 3/2012 Savage .................. C10L 1/02
　　　　　　　　　　　　　　　　　　　　　44/307

* cited by examiner

PHYCOCYANIN EXTRACTION AND PRODUCTION OF CRUDE BIO-OIL FROM BIOMASS

CROSS REFERENCE APPLICATIONS

This application is a continuation-in-part of application Ser. No. 14/652,283 filed 15 Jun. 2015, which is a 371 of International Application PCT/IN2014/000313 filed 8 May 2014, which claims priority from India Application No.: 2899/MUM/2013 filed 6 Sep. 2013, the content of which is incorporated herein by reference.

FIELD

The present disclosure relates to the field of preparation of crude bio-oil (CBO) from the biomass.

DEFINITIONS

Crude bio-oil: The term "crude bio-oil (CBO)" as used herein the present disclosure means an oil or biofuel derived from a biomass and which can be used as an alternative to petroleum crude oil/fuel.

BACKGROUND

Algae forms the life-supporting foundation of the natural food chain by providing the essential vitamins, minerals, proteins, and nutrients required to support life. The health benefits of some algae have long been appreciated when used as a dietary supplement for promoting and sustaining human health.

Phycocyanin, an accessory pigment to chlorophyll, is a pigment protein (phycobiliprotein) having characteristic light blue color and is mainly found in cyanobacteria. Phycocyanin has a wide range of applications such as, fluorescent markers, antioxidants, Immuno-modulant in pathological conditions, neuroprotective and hepatoprotective, natural pigments in food and cosmetics and the like.

Conventional methods for isolating phycocyanin from algae/cyanobacteria involve suspending dried, fresh or frozen blue-green algae in an aqueous solution to produce a cell suspension; disrupting the integrity of the algal/cyanobacterial cells, thereby releasing cytoplasmic contents, to produce a disrupted cell suspension; separating solid and liquid phases of the disrupted cell suspension; contacting the liquid phase of the disrupted cell suspension with a non-ionic polyaromatic macroreticular adsorbent resin; collecting the liquid phase from the resin to produce a phycocyanin extract; and optionally dehydrating the phycocyanin extract. The process may further involve contacting the extract with bed of silica gel/aluminum oxide/activated charcoal.

Some processes involve separation and purification of phycocyanin including precipitation, centrifugation, dialysis and chromatography process, these methods are difficult to carry out and are also expensive, and the resulting purity is not of the desired range/volume.

Though various process for the extraction of phycocyanin are known, the extraction rate is not high, resulting in an increased production costs and also the processes are tedious and time consuming.

It is therefore, desired to provide a simple and economic process which can be an alternative to the known process and which can also overcome the drawbacks associated with the known process such as complex process steps, time consuming, less yielding and un-economic, to obtain a biomass, that is substantially free from phycocyanin which can be used further for conversion to crude bio-oil.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a process for the extraction of phycocyanin.

Another object of the present disclosure is to provide a high yielding process for producing crude bio-oil from the biomass, which is substantially free of phycocyanin, through hydrothermal liquefaction.

Other objects and advantages of the present disclosure will be more apparent from the following description, which is not intended to limit the scope of the present disclosure.

SUMMARY

The present disclosure envisages a process for extracting phycocyanin from algae to obtain a biomass that is substantially free from phycocyanin.

The present disclosure also envisages a process for the conversion of the biomass that is substantially free from phycocyanin to crude bio-oil. Phycocyanin is first extracted from the algal biomass to obtain a biomass that is at least 90 to 95% free from phycocyanin, i.e. to obtain a phycocyanin extracted biomass (PEB). Then using this PEB, aqueous slurry is prepared in water to which a catalyst composition is added to form a reaction mixture. Further this reaction mixture undergoes hydrothermal liquefaction (HTL) in presence of hydrogen gas at a temperature ranging from 200 to 400° C. and at a pressure ranging from 70 to 250 bars for a time period ranging from 10 to 180 minutes to obtain a resultant crude bio-oil. This resultant crude bio-oil is cooled, separated to obtain the crude bio-oil and a residue. The carbon content of the crude bio-oil is in the range of 60% to 80%.

The algal mass is selected from the group consisting of *Rhodophyta, Chlorophyta, Phaeophyta, Chrysophyta, Cryptophyta, Dinophyta, Tribophyta, Glaucophyta, Spirulina, Microcystis, Anabaena, Nodularia, Oscillatoria, Spirogyra* and *Phormidium*.

Further the catalyst composition is recovered from the residue by sieving, calcining or reducing the residue, followed by recycling of the recovered catalyst composition in the process of the present disclosure.

BRIEF DESCRIPTION OF ACCOMPANYING DRAWINGS

Lanes:
  M illustrates Precision plus protein standards (Biorad—Cat. No. 161-0373).

1 illustrates 100 ng crude phycocyanin extract;
2 and 4 illustrate 200 ng crude phycocyanin extract;
3 illustrates 300 ng crude phycocyanin extract; and
5 illustrates 65 ng 20-70% Ammonium sulphate precipitated phycocyanin extract.

Lanes.

M illustrates Precision plus protein standards (Biorad—Cat. No. 161-0373);
1 illustrates 100 ng crude phycocyanin extract;
2 and 4 illustrate 200 ng crude phycocyanin extract;
3 illustrates 300 ng crude phycocyanin extract; and
5 illustrates 65 ng 20-70% Ammonium sulphate precipitated phycocyanin extract.

DETAILED DESCRIPTION

Nitrogen being an elemental part of phycocyanin (protein) hinders the extraction of liquid during the process of hydrothermal liquefaction (HTL). In order to make microalgae an economically viable alternative for bio crude production, the revenues from all their fractions, apart from only the lipids, need to be maximized. When phycocyanin is extracted from the algal biomass, almost 45-50% of total cellular protein is extracted resulting in a higher yield of the crude bio-oil. Thus, by the extraction of phycocyanin and HTL of the biomass that is substantially free from phycocyanin, there is enhancement in the production of crude bio-oil.

The present disclosure provides a simple and efficient process for the extraction of phycocyanin from a biomass, especially algae and subjecting the left over biomass which is substantially free from phycocyanin to hydrothermal liquefaction (HTL) to obtain crude bio-oil (CBO).

In accordance with an embodiment of the present disclosure there is provided a process for extracting phycocyanin from algae.

In one embodiment of the present disclosure, the process for extracting phycocyanin from an algal mass comprises the following steps:
a) obtaining an algal mass;
wherein said algal mass is selected from the group consisting of *Rhodophyta, Chlorophyta, Phaeophyta, Chrysophyta, Cryptophyta, Dinophyta, Tribophyta, Glaucophyta, Spirulina, Microcystis, Anabaena, Nodularia, Oscillatoria, Spirogyra* and *Phormidium;*
b) concentrating the algal mass by centrifuging at 8000-12000 rpm for 12-20 minutes at 4° C. to obtain a concentrated biomass;
c) transferring the concentrated biomass into a container and adding 225-300 ml of at least one buffer having pH ranging from 6-9 followed by sealing said container;
d) freezing the biomass contained in said sealed container at a temperature in the range of −100 to −10° C. for a period of 3 to 5 hours to obtain a frozen biomass;
e) thawing rapidly said frozen biomass by immersing said container in a water bath having temperature in the range of 50 to 60° C. for 2-5 minutes to obtain a thawed biomass slurry;
f) repeating steps d) and e) at least once; and
g) subjecting the thawed biomass slurry to centrifugation at 8000-12000 rpm for 12-20 minutes at 4° C. to obtain a supernatant containing phycocyanin and the biomass, that is substantially free from phycocyanin, i.e. to obtain a phycocyanin extracted biomass (PEB).

The algae used in the present disclosure are native to the Indian continent and grows in Maharashtra, Kerala, particularly in Uttar Pradesh and Tamil Nadu. These algae can be sourced from any of the above mentioned natural sources.

In another embodiment of the present disclosure, the process for extracting phycocyanin from an algal mass comprises at least one additional step of centrifugation of the obtained phycocyanin.

In yet another embodiment of the present disclosure, the container includes but is not limited to, a plastic bag.

In still another embodiment of the present disclosure, the freezing-thawing cycles are repeated 2 to 6 times.

In yet another embodiment of the present disclosure, the buffer is selected from the group consisting of, but not limited to, Na-Phosphate buffer, Tris and Trizma.

In still another embodiment of the present disclosure, the buffer is 10 mM Na-Phosphate buffer.

In one embodiment of the present disclosure, phycocyanin is concentrated using the ammonium sulphate precipitation method. The precipitated phycocyanin is pelleted by centrifugation and the obtained phycocyanin pellets are kept in dark at a temperature in the range of 2 to 8° C.

In accordance with an embodiment of the present disclosure, there is provided a process for conversion of the biomass that is substantially free from phycocyanin to crude bio-oil.

In one embodiment of the present disclosure, the process for conversion of the biomass that is substantially free from phycocyanin to crude bio-oil comprises the following steps:
a. extracting phycocyanin from the algal biomass to obtain a phycocyanin extracted biomass (PEB) that is at least 90 to 95% free from phycocyanin as measured by spectrophotometry;
b. preparing an aqueous slurry of the PEB in water, wherein the concentration of the PEB in the aqueous slurry ranges from 5% to 35%;
c. adding a catalyst composition as herein described, to the aqueous slurry, in an amount in the range of 1 to 20 wt. % with respect to the PEB to form a reaction mixture;
d. hydrothermal liquefying (HTL) the reaction mixture in the presence of hydrogen gas at a temperature ranging from 200 to 400° C. and at a pressure ranging from 70 to 250 bars for a time period ranging from 10 to 180 minutes to obtain a resultant crude bio-oil; and
e. cooling the resultant and separating crude bio-oil from the resultant;
wherein the step of separation is achieved by at least one step selected from the group consisting of filtration, centrifugation, decantation, adsorption, chromatography, liquid-liquid extraction and solid-phase extraction.

In an embodiment of the present disclosure, the process for conversion of the biomass that is substantially free from phycocyanin to crude bio-oil is carried out in the presence or absence of at least one hydrogen source.

In another embodiment of the present disclosure, the process for conversion of the biomass that is substantially free from phycocyanin to crude bio-oil is carried out in the presence or absence of at least one catalyst.

In yet another embodiment of the present disclosure, the catalyst composition used in the process for conversion of the biomass, that is substantially free from phycocyanin to crude bio-oil is a solid catalyst or a surfactant catalyst or an ionic liquid catalyst or a metal catalyst composition.

In an embodiment of the present disclosure, the solid catalyst is CoMo/Al$_2$O$_3$, which is disclosed in the published Indian patent application number 2899/MUM/2013.

In still another embodiment of the present disclosure, the surfactant catalyst used in the process for conversion of the biomass, that is substantially free from phycocyanin to crude bio-oil includes, is selected from the group consisting of, but is not limited to, cationic, anionic or nonionic surfactants.

In an embodiment of the present disclosure, the nonionic surfactant includes, but is not limited to, polyethylene glycols (PEG), block copolymers based on ethylenoxide and propylenoxide.

In an embodiment of the present disclosure, the surfactant includes a cation selected from the group consisting of, but not limited to, quaternary ammonium, pyridinium, imidazolium and pyrazolium; and an anion selected from the group consisting of, but not limited to, chloride, bromide, iodide, sulphonate, oleate, sulphate, oxalate, stearate, and laurate.

In yet another embodiment of the present disclosure, the surfactant catalyst used in the process for conversion of the biomass, that is substantially free from phycocyanin to crude bio-oil is selected from the group consisting of, but not limited to, quaternary ammonium compounds with halides, benzyl, alkyl benzenes, alpha olefins, alkyl, fatty acid ester, octyl, dioctyl, trioctyl, phosphate esters, $C_{10}$-$C_{13}$ ethoxylates, cetyloleyl ethoxylates, PEG, Block copolymers, sorbitan esters, sorbitan ester ethoxylates, amine ethoxylates, castor oil ethoxylates, fatty acid ethoxylates, phenol ethoxylates, fatty acid alkanamides, amine oxides, betaines, amphopropionates, aminodipropionates, mono laurates, oleates, stearate, glycol, lauryl sulphates and the like.

In an embodiment of the present disclosure, the ionic liquid catalyst used in the process for conversion of the biomass, that is substantially free from phycocyanin to crude bio-oil is selected from the group consisting of, but not limited to, a cation with quaternary ammonium, pyridinium, imidazolium, pyrazolium, pyrrolidinium, piperidinium, tetraalkylammonium, tetraalkylphosphonium, trialkylsulfonium, N-alkylpyridinium, and 1,3-dialkylimidazolium, and an anion of fluoride, chloride or bromide or iodide or sulphonate, oleate, sulphate, hydrogensulphates, oxalates, triflates, borates, phosphates, imides, cyanamides, cyanoborates, fluoroborates, fluoroacetates, cyanomethanes, toluenesulfonates, BF4-, PF6-, SbF6-, NO3-, (CF3SO3)2N—, ArSO3-, CF3CO2-, CH3CO2- and Al2Cl7-.

In accordance with an embodiment of the present disclosure there is provided a metal catalyst composition. The catalyst composition of the present disclosure comprises:
  at least one metal in an amount of 0.1 to 15 wt. %;
    wherein the metal is selected from the group consisting of group Ib, group IIb metals, group IVb metals, group Vb metals, group VIb metals, group VIIb metals, group VIII metals and noble metals:
  at least one support in an amount of 30 to 96 wt. %;
    wherein said support is selected from the group consisting of alumina, silica, zirconia, alumina-silica, zeolite and molecular sieves; and
  at least one solubilizing agent in an amount of 4 to 50 wt. %; and
    wherein said solubilizing agent selected from the group consisting of ammonia solution, piperidine, pyrrolidine, morpholine, piperazine hydrate, 2-methylcyclohexyl amine, cyclohexylamine and hexamethyleneimine.

In an embodiment of the present disclosure, the metal is selected from the group consisting of, but not limited to, nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh).

In another embodiment of the present disclosure, the metal compound comprises a cation selected from the group consisting of nickel (Ni), molybdenum (Mo), cobalt (Co), zinc (Zn), zirconium (Zr), vanadium (V), tungsten (W), rhenium (Re), platinum (Pt), palladium (Pd), ruthenium (Ru) and rhodium (Rh); and an anion selected from the group consisting of chlorides, bromides, fluorides, iodides, sulfates, phosphates, phosphonates, nitrates, nitrites, carbonates, acetates, acetylacetates, acetylacetonates, bicarbonates, hydroxides and oxides.

In another aspect of the present disclosure, there is also provided a process for the preparation of the catalyst composition.

In an embodiment of the present disclosure, the process for preparation of the catalyst composition comprises:
  a) obtaining at least one support;
  b) preparing at least one dispersion containing at least one metal and metal compound;
     wherein the metal compound comprises a metal selected from the group consisting of Ib metals, IIb metals, IVb metals, Vb metals, VIb metals, VIIb metals, VIII metals and noble metals;
  c) adding at least one solubilizing agent at least one dispersion to form a mixture;
     wherein the solubilizing agent is selected from the group consisting of ammonia solution, piperidine, pyrrolidine, morpholine, piperazine hydrate, 2-methylcyclohexyl amine, cyclohexylamine and hexamethyleneimine;
  d) impregnating the support with the mixture to obtain a metal impregnated support; and
  e) drying the metal impregnated support followed by calcining and reducing the metal impregnated support to obtain the catalyst composition.

In an embodiment of the present disclosure, the presence of the surfactant assists in the phase transfer catalytic functionality.

In another embodiment of the present disclosure, the catalyst composition is in an amount in the range of 1 to 20 wt. % with respect to said biomass that is substantially free from phycocyanin.

In yet another embodiment of the present disclosure, the support is in the form of extrudates, spheres, pellets or powder.

In still another embodiment of the present disclosure, the support is selected from the group consisting of alumina, silica, zirconia, alumina-silica, zeolite or molecular sieves.

In yet another embodiment of the present disclosure, the support comprises:
  a) 30 to 100 wt % of at least one carrier selected from the group consisting of alumina, silica, zirconia, alumina-silica, zeolite and molecular sieves; and
  b) 0.001 to 70 wt % of at least one binder selected from the group consisting of aluminophosphate, psuedoboehmite, alumina oxide, silica and ludox silica solution.

In an exemplary embodiment of the present disclosure, the yield of the crude bio-oil is in the range of 40% to 60%.

In another exemplary of the present disclosure, the carbon content of said bio-crude in the range of 60% to 80%.

In yet another embodiment of the present disclosure, the process for the conversion of PEB to crude bio-oil further comprises an additional step of recovering and recycling the catalyst composition, said process comprising the following steps:

recovering the catalyst composition from the residue by sieving, calcining or reducing the residue followed by recycling of the recovered catalyst composition in the process for the conversion of algal biomass to crude bio-oil.

In still another embodiment of the present disclosure, the buffer used in the process for the conversion of biomass, that is substantially free from phycocyanin to crude bio-oil is 10 mM Na-Phosphate buffer.

In yet another embodiment of the present disclosure, the support used in the process for the conversion of biomass, that is substantially free from phycocyanin to crude bio-oil is in the form of an extrudate, a sphere, a pellet or a powder.

In still another embodiment of the present disclosure, the catalyst used in the process for the conversion of biomass, that is substantially free from phycocyanin to crude bio-oil is CoMo/$Al_2O_3$. The details of the catalyst are disclosed in the published Indian patent application number 2899/MUM/2013.

In yet another embodiment of the present disclosure, the catalyst used in the process for the conversion of biomass, that is substantially free from phycocyanin to crude bio-oil is CTAB. The details of the catalyst are disclosed in the published Indian patent application number 1143/MUM/2014.

The present disclosure is further described in light of the following laboratory scale experiments which are set forth for illustration purpose only and not to be construed for limiting the scope of the disclosure. The following experiments can be scaled up to industrial/commercial scale and the results obtained can be extrapolated to industrial/commercial scale.

Experiment 1: Extraction and Concentration of Phycocyanin.

A cyanobacterial strain was purchased from Sanat Products, India. The cyanobacteria was then concentrated using Thermo Sorval RC6 plus centrifuge at 10000 rpm at 4° C. for 15 mins. The 500 g of pelleted biomass thus obtained was then distributed in plastic bags and 250 mL of 10 mM Na-Phosphate buffer having pH 8 was further added to the plastic bags. Water-tight sealing of the bags containing the algae and buffer was then carried out using commercial heat sealer keeping enough head space to get an area of 25 mm×30 mm×5 mm (L×B×H).

A 5 mm thin biomass film was formed in the bag which was frozen at −80° C. for 3-4 h. The frozen thin biomass films were then rapidly thawed by immersing the bag in a water bath having the temperature of 55° C. for 2-3 min. These freezing-thawing cycles were repeated 3 times.

The bags were then opened and the biomass slurry was recovered in 1 L centrifuge bottles. These centrifuge bottles were then centrifuged in Thermo Sorval RC6 plus centrifuge at 10000 rpm at 4° C. for 15 mins. The supernatant thus obtained was collected which contained phycocyanin while the pellet contained extracted biomass, being 90% free of phycocyanin. Oil content in the biomass, that is substantially free from phycocyanin, was determined. A control biomass without freezing thawing cycles was used as non-extracted biomass to compare the oil content difference. It was observed that the oil content determined by HTL process was not affected by the phycocyanin extraction. This can be correlated as phycocyanin being protein and removal of that portion significantly reduced total Nitrogen load, which improved overall HTL performance.

Phycocyanin was further concentrated by ammonium sulphate precipitation. Phycocyanin was precipitated out since ammonium sulphate has more solubility than phycocyanin in the range of 20-70% saturation. The precipitated phycocyanin was then pelleted by centrifugation using Thermo Sorval RC6 plus centrifuge at 10000 rpm at 4° C. for 15 mins. The phycocyanin pellet was kept at 4° C. in dark.

Figure 1:
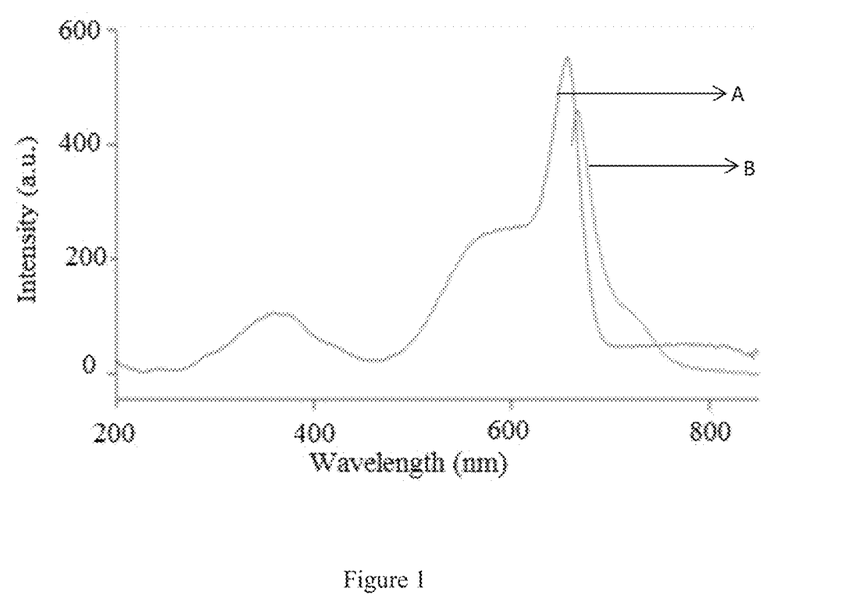
FIG. 1 illustrates the Absorption and Fluorescence Overlay Spectrum of phycocyanin, which was carried out in Carry Eclipse Fluorometer (Agilent Cary Eclipse), wherein A represents an absorption wavelength scanning and B represents an emission wavelength scanning.

FIG. 1 illustrates the Absorption and Fluorescence Overlay Spectrum of phycocyanin, which was carried out in Carry Eclipse Fluorometer (Agilent Cary Eclipse). The graph plotted with wavelength on X axis and intensity on Y axis. Based upon the graph readings, it was confirmed that the extraction method was gentle and intact protein was extracted, since only one peak was observed which indicates that phycocyanin was extracted without rupturing it.

Figure 2:
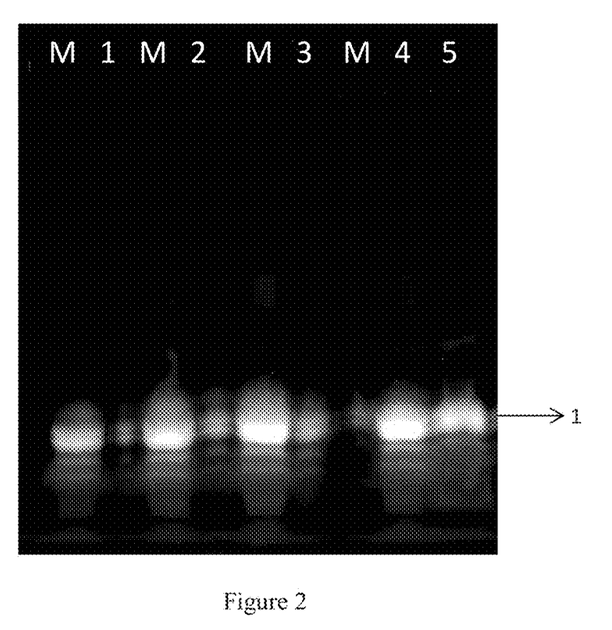
FIG. 2 illustrates the integrity of the extracted phycocyanin which was checked by 4-15% gradient TGX polyacrylamide gel electrophoresis (PAGE) at 100V-60 min, wherein 1 represents bilin fluorescence of α and β subunits of phycocyanin.

FIG. 2 illustrates the integrity of the extracted phycocyanin which was checked by 4-15% gradient TGX polyacrylamide gel electrophoresis (PAGE) at 100V-60 min. After the run was complete, the gel was soaked for 5 min in 10 mM $ZnSO_4$ solution. Since zinc staining has specificity to identify bilin part of the phycocyanin and gives orange fluorescence under UV light, as depicted in FIG. 2.

Figure 3:
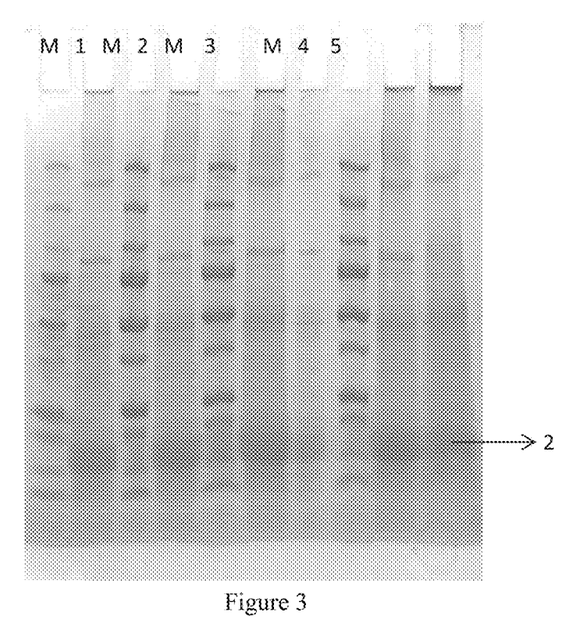
FIG. 3 illustrates the image of the Bio-Safe Coomassie stained gel captured on white light filter in ChemDoc MP System, wherein 2 represents the major protein, i.e. α and β subunits of phycocyanin.

The gel was then washed 3 times in distilled water and then stained with Bio-Safe Coomassie Stain (Biorad—161-0786) and incubated for 1 hour at room temperature followed by washing with distilled water until complete background disappeared and sharp protein bands were visible. The image was captured on white light filter in ChemDoc MP System which is illustrated in FIG. 3. Bio-Safe Coomassie Staining clearly showed two subunits ($\alpha$ and $\beta$) of about 17 and 18 kD each. Bio-Safe Coomassie Stain of PAGE also confirmed Phycocyanin is major protein in total protein crude extract.

Experiment 2: Conversion of Biomass, that is Substantially Free from Phycocyanin to Crude Bio-Oil (CBO).

The biomass, that is 90% free from phycocyanin, obtained in Experiment 1, was used for preparing crude bio-oil.

Initially, in a reaction vessel, 23 gram of biomass which is 90% free from phycocyanin was used to prepare aqueous slurry of 30% concentration. Further 10 wt % of CoMo/$Al_2O_3$ with respect to the biomass, was added to the slurry.

This slurry was mixed properly and then subjected to hydrothermal liquefaction (HTL) in presence of hydrogen gas at a temperature of 400° C., 25% moisture and at a pressure of 200 bar for 60 minutes in order to break down and reform the chemical building blocks.

Further, upon cooling, the products were collected, filtered and separated by centrifugation at 10000 rpm for 15 min to obtain crude bio-oil and other residue/s.

Biological Repeat of Batch II i.e. independent repeat started with fresh *Spirulina* culture from different batch to check the repeatability and reliability of results obtained in previous batch was also carried out.

TABLE 1

CBO yield with Phycocyanin Extracted Spirulina and Phycocyanin containing Spirulina.

| Sr. No. | Algae | Catalyst | Temperature, ° C. | CBO Yield, % |
|---|---|---|---|---|
| 1 | Spirulina containing Phycocyanin | No Catalyst | 350 | 43 |
| 2 | Phycocyanin Extracted | No Catalyst | 350 | 48 |

TABLE 1-continued

CBO yield with Phycocyanin Extracted Spirulina and Phycocyanin containing Spirulina.

| Sr. No. | Algae | Catalyst | Temperature, °C. | CBO Yield, % |
|---|---|---|---|---|
| 3 | Spirulina Phycocyanin Extracted | CoMo/Al2O3 | 350 | 52 |
| 4 | Spirulina Phycocyanin Extracted | Surfactant | 350 | 61 |
| 5 | Spirulina Phycocyanin Extracted | Surfactant | 365 | 65 |
| 6 | Spirulina containing Phycocyanin (Biological Repeat) | No Catalyst | 350 | 44 |
| 7 | Phycocyanin Extracted Spirulina (Biological Repeat with Batch II) | CoMo/Al2O3 | 350 | 50 |
| 8 | Phycocyanin Extracted Spirulina (Biological Repeat with Batch II) | Surfactant | 350 | 62 |
| 9 | Phycocyanin Extracted Spirulina (Biological Repeat with Batch II) | Surfactant | 365 | 65 |

Experiment 3:

A comparative study between 3 samples was performed for ascertaining the CBO yield.

- 23 grams of *spirulina* was added in a first reaction vessel.
- 23 grams of *spirulina* was added in a second reaction vessel. Further 2.3 grams of CTAB was added and mixed properly.
- 23 grams of *spirulina* from which 90% phycocyanin was extracted was added in a third reaction vessel. Further 2.3 grams of CTAB was added and mixed properly.

Aqueous biomass slurry of 30% concentration was prepared in respective reaction vessels. This slurry was mixed properly and then subjected to hydrothermal liquefaction (HTL) in presence of hydrogen gas at a temperature of 350° C., 25% moisture and at a pressure of 200 bar for 60 minutes in order to break down and reform the chemical building blocks.

Further, upon cooling, the respective products were collected, filtered and separated by centrifugation at 10000 rpm for 15 min to obtain crude bio-oil and other residue/s.

TABLE 2

CBO yield with Phycocyanin Extracted Spirulina with CTAB, Phycocyanin containing Spirulina and Phycocyanin containing Spirulina with CTAB.

| Species | Catalyst | Temperature | Time | CBO yield, % |
|---|---|---|---|---|
| Spirulina (Blue green algae) with phycocyanin | No | 350° C. | 30 | 32 |
| Spirulina (Blue green algae) | CTAB | 350° C. | 30 | 45 |

TABLE 2-continued

CBO yield with Phycocyanin Extracted Spirulina with CTAB, Phycocyanin containing Spirulina and Phycocyanin containing Spirulina with CTAB.

| Species | Catalyst | Temperature | Time | CBO yield, % |
|---|---|---|---|---|
| with phycocyanin Spirulina (Blue green algae) with phycocyanin extracted. | CTAB | 350° C. | 30 | 65 |

Similar experiments can be performed with *Rhodophyla, Chlorophyla, Phaeophyta, Chrysophyta, Cryptophyta, Dinophyta, Tribophyta, Glaucophyta, Microcystis, Anabaena, Nodularia, Oscillatoria, Spirogyra* and *Phormidium* to obtain similar results.

From the above table, it is observed that:
- HTL of algae without catalyst can give only ~40% crude bio-oil yield.
- HTL of algae with the catalyst composition gives about 46-60% crude bio-oil yield.
- Total Protein content before extraction was 36.73% and after extraction was 31.70%.
- Nitrogen content before extraction was 10.38% and after extraction was 4.72%.

Technical Advances and Economical Significance

The process of the present disclosure described herein above has several technical advantages including but not limited to the realization of:

a simple yet efficient method to extract phycocyanin from the algal mass without completely rupturing the algal cells;

a chemical/enzyme-free extraction of phycocyanin which does not require any down-stream processes;

the extracted phycocyanin which is more stable (bacteriostatic) at 4° C. without the need of storage at −20°/−80° C.

a high yield of crude bio-oil using the biomass left after the extraction of phycocyanin.

reuse of the catalyst in the next cycle of biomass conversion without affecting the CBO yield.

The embodiments as described herein above, and various features and advantageous details thereof are explained with reference to the non-limiting embodiments in the description. Descriptions of well-known aspects, components and molecular biology techniques are omitted so as to not unnecessarily obscure the embodiments herein.

The foregoing description of specific embodiments so fully reveal the general nature of the embodiments herein, that others can, by applying current knowledge, readily modify and/or adapt for various applications of such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein. Further, it is to be distinctly understood that the foregoing descriptive matter is to be interpreted merely as illustrative of the disclosure and not as a limitation.

Having described and illustrated the principles of the present disclosure with reference to the described embodiments, it will be recognized that the described embodiments can be modified in arrangement and detail without departing from the scope of such principles.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the conversion of algal biomass to crude bio-oil; said process comprising the following steps:
   a. extracting phycocyanin from said algal biomass to obtain a phycocyanin extracted biomass (PEB) that is at least 90 to 95% free from phycocyanin as measured by spectrophotometry;
   b. preparing an aqueous slurry of said PEB in water, wherein the concentration of said PEB in the aqueous slurry ranges from 5% to 35%;
   c. adding a catalyst composition, to the aqueous slurry, in an amount in the range of 1 to 20 wt. % with respect to said PEB to form a reaction mixture;
      wherein said catalyst composition is selected from solid catalyst and surfactant catalyst
   d. hydrothermal liquefying (HTL) said reaction mixture in the presence of hydrogen gas at a temperature ranging from 200 to 400° C. and at a pressure ranging from 70 to 250 bars for a time period ranging from 10 to 180 minutes to obtain a resultant crude bio-oil; and
   e. cooling said resultant and separating crude bio-oil from said resultant to obtain said crude bio-oil, wherein the yield of the crude bio-oil is from 40-60%, and a residue.

2. The process as claimed in claim 1, wherein the carbon content of said crude bio-oil is in the range of 60% to 80%.

3. The process as claimed in claim 1, further comprises an additional step of recovering and recycling said catalyst composition, said process comprising the following steps:
   recovering said catalyst composition from said residue by sieving, calcining or reducing said residue followed by recycling of said catalyst composition and adding said catalyst composition in step (c).

4. The process as claimed in claim 1, wherein said algal mass is selected from the group consisting of *Rhodophyta, Chlorophyta, Phaeophyta, Chrysophyta, Cryptophyta, Dinophyta, Tribophyta, Glaucophyta, Spirulina, Microcystis, Anabaena, Nodularia, Oscillatoria, Spirogyra* and *Phormidium*.

5. The process as claimed in claim 1, wherein said step of separation is, at least one step, selected from the group consisting of filtration, centrifugation, decantation, adsorption, chromatography, liquid-liquid extraction and solid-phase extraction.

6. The process as claimed in claim 1 wherein said solid catalyst is a $CoMo/Al_2O_3$ catalyst.

7. The process as claimed in claim 1 wherein said surfactant catalyst is a quaternary ammonium compound.

* * * * *